Feb. 23, 1926.
R. RICHTER
1,573,999
TELEOBJECTIVE
Filed June 6, 1925
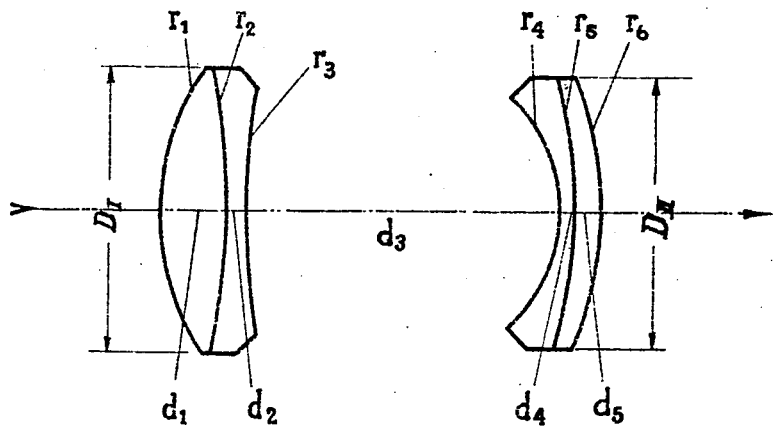
$r_1 = 16.95$
$r_2 = 45.35$
$r_3 = 52.00$
$r_4 = 10.77$
$r_5 = 32.00$
$r_6 = 19.35$
$d_1 = 4.5$
$d_2 = 1.3$
$d_3 = 21.2$
$d_4 = 1.0$
$d_5 = 2.0$
CROWN GLASS $N_D = 1.5162, \nu = 64.0$
FLINT $N_D = 1.6210, \nu = 36.3$
AIR
CROWN GLASS $N_D = 1.5162, \nu = 64.0$
FLINT $N_D = 1.6489, \nu = 33.8$
$D_I = 19.0$   $D_{II} = 18.0$
Focal length 100
Inventor:
Robert Richter Patented Feb. 23, 1926.

1,573,999

UNITED STATES PATENT OFFICE.

ROBERT RICHTER, OF BERLIN-FRIEDENAU, GERMANY, ASSIGNOR TO OPTISCHE ANSTALT C. P. GOERZ AKTIENGESELLSCHAFT, OF BERLIN-FRIEDENAU, GERMANY.

TELEOBJECTIVE.

Application filed June 6, 1925. Serial No. 35,339.

*To all whom it may concern:*

Be it known that I, Dr. ROBERT RICHTER, physicist, a citizen of the German Republic, residing at Berlin-Friedenau, Germany, have invented certain new and useful Improvements in Teleobjectives, for which a patent application has been filed in Germany on May 14th, 1924, of which the following is a specification.

This invention relates to a tele-objective or telephoto lens which is corrected spherically, chromatically and astigmatically, and is of that kind in which to a converging front member constituted by two lenses cemented together, is allotted a diverging rear member also constituted by two lenses cemented together, with a diverging cement surface, at a fixed distance from the front member, the rear member having the shape of a meniscus the concave face of which faces the front member.

In order to ensure the greatest possible sharpness in the middle in lenses of this kind which are distinguished by a smaller distortion, it is essential to make the air gap between the two members of the system as large as possible. This condition can be fulfilled for a prescribed total constructional length of the system, only by giving the least possible thickness to the diverging rear member, as the shape of the front member is substantially unalterable owing to correction requirements.

If at the same time fluctuations in the refractive qualities of the glass used (such as are unavoidable when using products of different batches of like compositions) should exercise the least possible influence on the lens shape, so that it should be possible to adhere in the manufacture to the calculated constants even when using glass originating from different batches, care must be taken to keep as low as possible the refractive power of the single lenses constituting the diverging member. This requirement is based on the same considerations as the above mentioned requirement concerning the smallest possible thickness of the rear member, and can be fulfilled by giving the cement surface a curvature in the same direction as the two outer surfaces, and by arranging the curvatures of the three faces of the diverging element which are curved in the same direction, in such a manner relatively to each other that the radius of curvature of the outer convex surface is smaller than that of the cement surface, and that the radius of curvature of the cement surface is smaller than five times the value of the radius of curvature of the outer concave surface of the rear member.

A construction of the new tele-objective is illustrated in the accompanying drawing. The constructional data for a focal length of 100 and an aperture ratio 1:5.5 are as follows:

$r_1 = 16,95$
$r_2 = 45,35$
$r_3 = 57,00$
$r_4 = 10,77$
$r_5 = 32,00$
$r_6 = 19,35$

| | | |
|---|---|---|
| $d_1 = 4,5$ | Crown glass | $n_D = 1.5162$, $\nu = 64.0$ |
| $d_2 = 1,3$ | Flint | $n_D = 1.6210$, $\nu = 35.3$ |
| $d_3 = 21,2$ | air | |
| $d_4 = 1,0$ | Crown glass | $n_D = 1.5162$, $\nu = 64.0$ |
| $d_5 = 2,0$ | Flint | $n_D = 1.6489$, $\nu = 33.8$ |

$D_I = 19,0 \quad D_{II} = 18,0$

In the above table, $r_1$ to $r_6$ are the radii of curvature of the lens surfaces occurring in the system; $d_1$ to $d_5$ the thicknesses of the lenses or the air gap between the two elements. $D_I$ and $D_{II}$ are the diameters of the two members of the system.

$n_D$ designates the index of refraction for the D line of the spectrum and $\nu$ a mathematical function of indices of refraction for the D, C and F lines of the spectrum which is characteristic for the dispersion of a kind of glass $$\nu = \frac{n_D - 1}{n_F - n_C}.$$

What I claim is:—

A tele-objective constituted by a converging front member and a diverging rear member at a fixed distance from the front member each of both members made of two lenses cemented together, the rear member having the shape of a meniscus with its concave surface facing the front member its cement surface being of diverging quality and curved in the same direction as the outer surfaces having however a radius of curvature which is greater than the outer convex surface but not larger than five times the radius of curvature of the concave face of the rear member.

In testimony whereof I have signed this specification.

DR. ROBERT RICHTER.